United States Patent
Wu et al.

(10) Patent No.: US 7,266,133 B2
(45) Date of Patent: Sep. 4, 2007

(54) METHODS AND APPARATUS FOR STATISTICAL MULTIPLEXING WITH DISTRIBUTED MULTIPLEXERS

(75) Inventors: Siu-Wai Wu, San Diego, CA (US); Keith J. Kelley, Encinitas, CA (US); Vinh Tran, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 902 days.

(21) Appl. No.: 10/696,927

(22) Filed: Oct. 30, 2003

(65) Prior Publication Data

US 2004/0090996 A1    May 13, 2004

Related U.S. Application Data

(60) Provisional application No. 60/425,796, filed on Nov. 13, 2002.

(51) Int. Cl.
*H04J 3/02* (2006.01)
*H04N 7/173* (2006.01)

(52) U.S. Cl. ............... 370/539; 370/541; 725/116; 725/117

(58) Field of Classification Search ........... 370/535, 370/447, 540, 541, 538, 539; 725/116, 117
See application file for complete search history.

(56) References Cited

U.S. PATENT DOCUMENTS

| | | | |
|---|---|---|---|
| 5,216,503 A | 6/1993 | Paik et al. | |
| 5,550,590 A | 8/1996 | Sakazawa et al. | |
| 5,682,387 A | 10/1997 | Satoh | |
| 5,761,398 A | 6/1998 | Legall | |
| 5,793,425 A | 8/1998 | Balakrishnan | |
| 5,929,916 A | 7/1999 | Legall et al. | |

(Continued)

FOREIGN PATENT DOCUMENTS

EP    0 685 971    12/1995

(Continued)

OTHER PUBLICATIONS

Wang, Limin, et al., "Bit Allocation and Constraints for Joint Coding of Multiple Video Programs", IEEE Transactions on Circuits and Systems for Video Technology, vol. 9, No. 6, Sep. 1999, pp. 949-959.

*Primary Examiner*—Seema S. Rao
*Assistant Examiner*—Jianye Wu
(74) *Attorney, Agent, or Firm*—Larry T. Cullen

(57) ABSTRACT

The present invention provides methods and apparatus for statistical multiplexing of a large number of data streams. A plurality of encoders are associated with each first stage multiplexer. Bandwidth allocation among all encoders is controlled by a second stage multiplexer. A bandwidth request message is communicated from each the encoders to the second stage multiplexer. The second stage multiplexer allocates available bandwidth based on the bandwidth request messages. The second stage multiplexer then communicates an allocated bandwidth message to each encoder. Each encoder encodes a data stream in accordance with its allocated bandwidth to provide an encoded data stream. A plurality of the encoded data streams are multiplexed at each first stage multiplexer to provide a multiplexed data stream at a constant data rate. The second stage multiplexer multiplexes the multiplexed data streams from the first stage multiplexers to provide a multiplexed transport stream.

24 Claims, 3 Drawing Sheets

U.S. PATENT DOCUMENTS

| | | |
|---|---|---|
| 5,933,450 A | 8/1999 | Ozkan et al. |
| 6,023,296 A | 2/2000 | Lee et al. |
| 6,055,270 A | 4/2000 | Ozkan et al. |
| 6,167,084 A | 12/2000 | Wang et al. |
| 6,493,388 B1 | 12/2002 | Wang |
| 6,594,271 B1 | 7/2003 | Wu et al. |
| 2002/0085584 A1 | 7/2002 | Itawaki |
| 2002/0116719 A1* | 8/2002 | Dapper et al. ............... 725/116 |
| 2002/0154620 A1* | 10/2002 | Azenkot et al. ............ 370/347 |
| 2003/0063626 A1* | 4/2003 | Karlquist .................... 370/503 |
| 2005/0010960 A1* | 1/2005 | Kitazawa et al. ........... 725/117 |

FOREIGN PATENT DOCUMENTS

| | | |
|---|---|---|
| EP | 0 804 035 | 10/1997 |
| FR | 2 790 899 | 10/2000 |
| GB | 2 356 323 A | 5/2001 |
| WO | WO 0184905 A | 11/2001 |

* cited by examiner

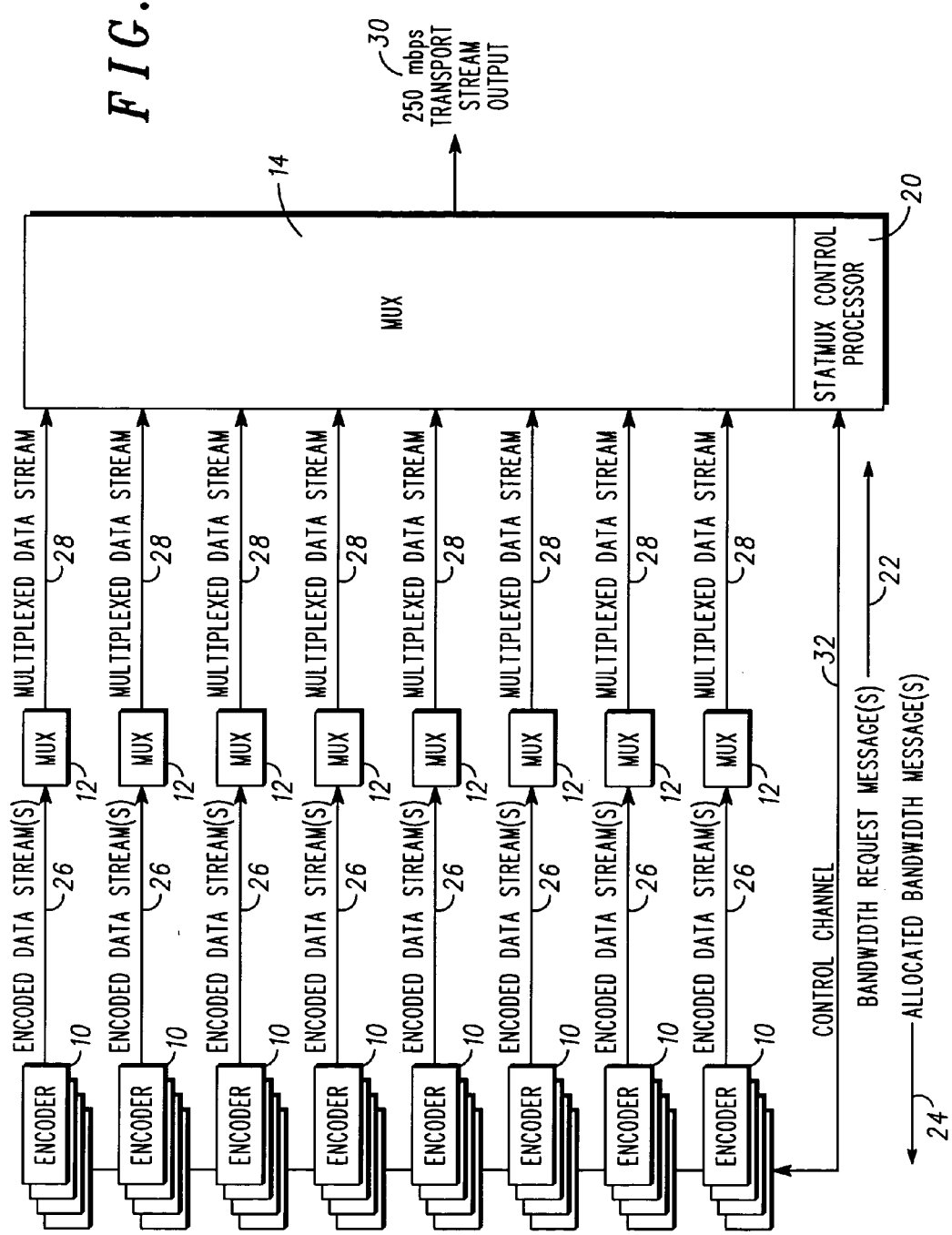

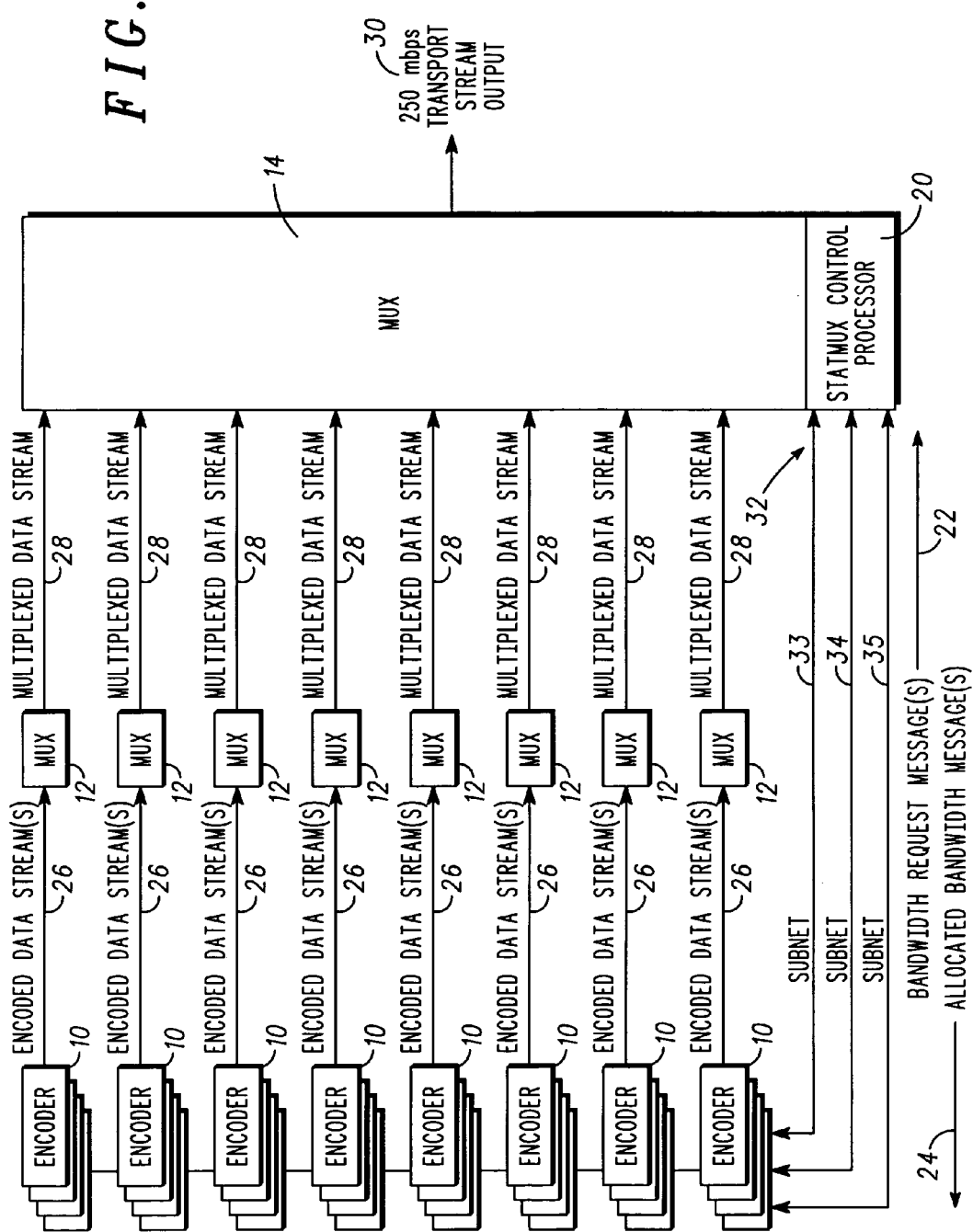

METHODS AND APPARATUS FOR STATISTICAL MULTIPLEXING WITH DISTRIBUTED MULTIPLEXERS

This application claims the benefit of U.S. provisional patent application No. 60/425,796 filed on Nov. 13, 2002, which is incorporated herein and made a part hereof by reference.

BACKGROUND OF THE INVENTION

The present invention relates generally to statistical multiplexing schemes for digital cable and satellite television signals. More specifically, the present invention provides methods and apparatus for statistical multiplexing of a large number of video channels using a distributed, multistage multiplexing architecture. The present invention is particularly applicable to any dense multiplexing scheme, for example systems that require statistical multiplexing of approximately 250 video channels.

Digital television offers viewers high quality video entertainment with features such as pay-per-view, electronic program guides, video-on-demand, weather and stock information, as well as Internet access and related features. Video images, packaged in an information stream, are transmitted to the user via a broadband communication network over a satellite, cable, or terrestrial transmission medium. Due to bandwidth and power limitations, efficient transmission of film and video demands that compression and formatting techniques be extensively used. Protocols developed by the Motion Pictures Experts Group (MPEG) such as MPEG-1 and MPEG-2 maximize bandwidth utilization for film and video information transmission by adding a temporal component to a spatial compression algorithm.

Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth. It may also be desired to change the relative quality level of a program by allocating more or fewer bits during encoding or transcoding.

Accordingly, the statistical multiplexer (statmux), or encoder, which includes a number of encoders for encoding uncompressed digital video signals at a specified bit rate, has been developed. The statistical remultiplexer (statremux), or transcoder, which handles pre-compressed video bit streams by re-compressing them at a specified bit rate, has also been developed. Moreover, functions of a statmux and statremux may be combined when it is desired to transcode pre-compressed data while also coding uncompressed data for transport in a common output bitstream. Uncompressed programs are coded for the first time, while compressed programs are re-encoded, typically at a different bit rate.

These statmux and statremux devices evaluate statistical information of the source video that is being encoded, and allocate bits for coding the different video channels accordingly. For example, video channels that have hard-to-compress video, such as a fast motion scene, can be allocated more bits, while channels with relatively easy to compress scenes, such as scenes with little motion, can be allocated fewer bits. An example of a statistical multiplexing scheme is disclosed in, for example, commonly-owned co-pending patent application Ser. No. 09/665,373 filed on Sep. 20, 2000 entitled Method and Apparatus for Determining a Bit Rate Need Parameter In A Statistical Multiplexer, which is incorporated herein and made a part hereof by reference.

As the number of services offered over cable and satellite television systems continue to grow, there has developed a need for improved multiplexing schemes that can accommodate the dense multiplexing required to deliver such a large number of services. It would be advantageous to provide a practical method to statistical multiplex a large number of video channels using a distributed, multistage multiplexing architecture.

The methods and apparatus of the present invention provide the foregoing and other advantages.

SUMMARY OF THE INVENTION

The present invention provides methods and apparatus for statistical multiplexing of a large number of data streams (e.g., video channels) using a distributed, multistage multiplexing architecture. In particular, the present invention provides modular and scalable statistical multiplexing architecture using a two-stage multiplexing scheme. A plurality of encoders are associated with each first stage multiplexer. The bandwidth allocation among all encoders is controlled by a second stage multiplexer, using a bandwidth request process. A bandwidth request message is communicated from each of a plurality of encoders to the second stage multiplexer. The second stage multiplexer allocates available bandwidth between the encoders based on the bandwidth request messages. The second stage multiplexer then communicates an allocated bandwidth message to each of the encoders. The allocated bandwidth message contains an allocated bandwidth for each encoder. Each encoder encodes a data stream in accordance with the allocated bandwidth for that encoder to provide an encoded data stream from each encoder. A plurality of the encoded data streams are multiplexed at each first stage multiplexer to provide a multiplexed data stream at a constant data rate. The second stage multiplexer mutiplexes the multiplexed data streams from a plurality of the first stage multiplexers to provide a multiplexed transport stream.

The transport rate output from each first stage multiplexer is constant and may be up to the output transport rate of the second stage multiplexer. Such a constant output transport rate is easier to implement than a variable transport rate. However, the total bandwidth within each first stage multiplex remains variable, and any unused bandwidth may be filled with null packets, which can be dropped to provide bandwidth for additional data (or vice versa). This allows the two-stage multiplexer to be used for a single large stamux group that occupies a large output data pipe (e.g., 250 Mbps).

Corresponding methods and apparatus are provided.

BRIEF DESCRIPTION OF THE DRAWINGS

The present invention will hereinafter be described in conjunction with the appended drawing figures, wherein like numerals denote like elements, and:

FIG. 2 shows a block diagram of an example embodiment of the invention; and

FIG. 3 shows a block diagram of a further example embodiment of the invention.

DETAILED DESCRIPTION OF THE INVENTION

Figure 1:
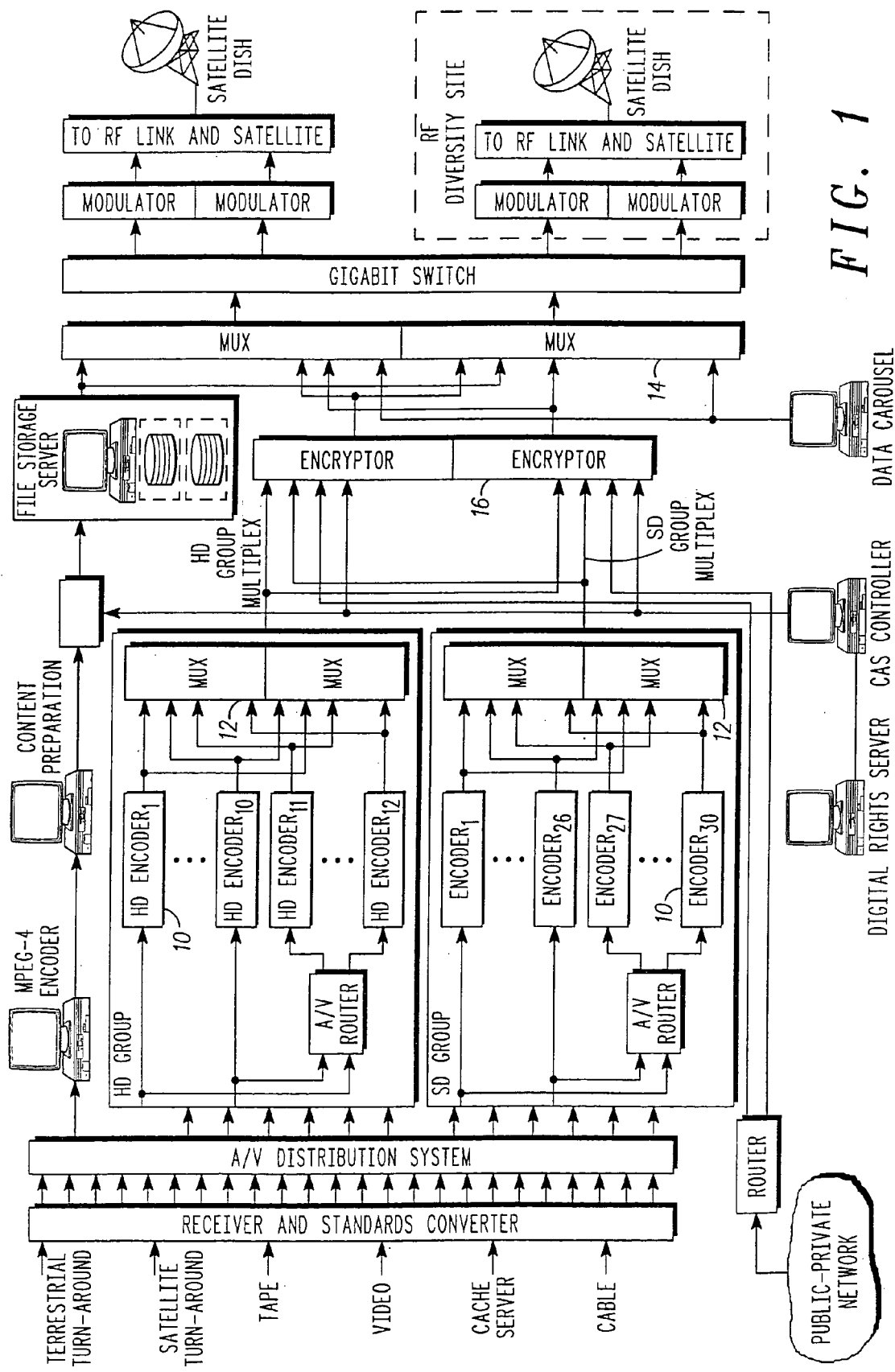
FIG. 1 shows an example illustration of media hub architecture for use with an example embodiment of the invention.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention provides methods and apparatus which enable expanded statistical multiplexing capabilities. FIG. 1 illustrates an example of proposed media hub architecture that can be used in connection with the present invention. In a prior art design, each first stage multiplexer 12 (designated in the HD (high definition) and SD (standard definition) Groups as MUX) controlled the statistical multiplexing process for the encoders 10 connected to it. Each statistical multiplex processor serviced up to 30 encoders. With the present invention, the statistical multiplex processor is removed from each first stage multiplexer 12 and a single statistical multiplex processor (statmux control processor) is added to the second stage multiplexer 14, as shown in FIG. 2. The statmux control processor 20 at the second stage multiplexer 14 controls the statistical multiplexing process across all encoders 10 associated with all first stage multiplexers 12. Overall, the revised architecture of the present invention will provide improved efficiency, greater flexibility, and better video quality.

The architecture of the present invention includes the following features:

1. Statistically multiplexing of all encoded services;
2. Creating and deleting services without impacting other services;
3. Activating or de-activating services without impacting other services; and
4. Changing bandwidth allocation to a service within the range of zero to maximum allowable output bandwidth for the service without impacting other services.

In an example embodiment of the invention as shown in FIG. 2, methods and apparatus are provided for statistical multiplexing of a plurality of data streams. A plurality of first stage multiplexers 12 are provided. A plurality of encoders 10 are operatively associated with each first stage multiplexer 12. A second stage multiplexer 14 is operatively associated with the plurality of first stage multiplexers 12. A statmux control processor 20 is operatively associated with the second stage multiplexer 14.

A bandwidth request message 22 may be communicated from each of the encoders 10 to the statmux control processor 20. The stamux control processor 20 may then allocate the available bandwidth based on the bandwidth request messages 22. Once the allocation is complete, the statmux control processor 20 communicates an allocated bandwidth message 24 to each of the encoders 10 that contains an allocated bandwidth for each of the encoders 10 based on the allocating. Each of the encoders 10 encodes a data stream in accordance with the allocated bandwidth for that encoder 10, providing an encoded data stream 26 from each encoder 10. Each of the first stage multiplexers 12 multiplexes a plurality of the encoded data streams 26 from the encoders 10 associated therewith, providing a multiplexed data stream 28 at a constant data rate from each of the first stage multiplexers 12. The second stage multiplexer 14 multiplexes a plurality of the multiplexed data streams 28 from the first stage multiplexers 12 to provide a multiplexed transport stream 30.

The statistical multiplexing processor 20 compares the bandwidth request messages 22 against the available bandwidth (for example, the available bandwidth may be 250 Mbps). Each of the bandwidth request messages 22 may be based on a video complexity level of the content to be encoded. For example, allocation may be made by comparing video complexity levels of all encoded services. The statistical multiplexing processor 20 then sends allocated bandwidth messages 24 to each of the encoders 10 with the allocated bandwidth. The statmux control processor 20 may periodically reallocate the bandwidth based on newly received bandwidth request messages 22. For example, the bandwidth request and allocation process may take place approximately every 1 ms.

The output bandwidth of each first stage multiplexer 12 is configured to a constant data rate, for example, 80 Mbps. This configuration allows additional data to flow through each first stage multiplexer 12 without adjusting the output bandwidth. For example, during normal operation, less than 35% of the output bandwidth may be used to carry data packets. The remaining bandwidth may be filled with null packets. If additional data (e.g., television services) is added to that first stage multiplexer 12, then the percentage of data packets increase while the null packets decrease. This allows services to be added or deleted to the first stage multiplexer 12 without impacting other services. In addition, services may be activated or de-activated (i.e., deactivated services are services that are still defined but not in use) without impacting other services. Additionally, bandwidth allocated to the services may be changed without impacting other services. However, the aggregate output bandwidth of the first stage multiplexer 12 remains at the constant rate (e.g., 80 Mbps).

Accordingly, in one example embodiment of the invention, a number of null packets may be provided to the plurality of encoded data streams 26 at one of the first stage multiplexers 12 in the event that a total bandwidth allocated to the encoders 10 associated with that first stage multiplexer 12 is less than the constant data rate. The null packets may then be stripped off from the multiplexed data stream 28 at the second stage multiplexer 14.

An amount of additional data may be provided to one or more of the first stage multiplexers 12. The number of null packets that are added may be reduced corresponding to the amount of additional data.

The data streams may comprise television services. The present invention enables services to be added or deleted at the first stage multiplexers 12. A number of null packets may be added or deleted corresponding to the added or deleted services. In addition, services may be activated or deactivated at the first stage multiplexers 12. A number of null packets may be added or deleted corresponding to the activated or deactivated services.

The bandwidth allocated to the services may be changed at the first stage multiplexers 12 while maintaining the constant data rate.

A total data rate output from the plurality of first stage multiplexers 12, including the null packets, may be greater than the available bandwidth of the second stage multiplexer. The null packets are then stripped off at the second stage multiplexer 14.

In order to build the multiplexed transport stream 30 (for example a 250 Mbps transport stream), the outputs from several first stage multiplexers 12 may be passed through encryptors 16 (see FIG. 1) and then to the second stage multiplexer 14. The encryptors 16 encrypt the data streams and forward the encrypted data streams to the second stage multiplexer 14. The second stage multiplexer 14 strips off any null packets that have been added and multiplexes the data packets to form the final multiplexed transport stream 30.

In a further example embodiment of the invention, a dedicated control channel 32 may be provided between the encoders 10 and the statmux control processor 20 for communicating the bandwidth request messages 22 and the allocated bandwidth messages 24. As shown in FIG. 3, the dedicated control channel 32 may comprise a plurality of subnets 33, 34, and 35 in order to mitigate congestion. The messages travel on their appropriate subnets 33, 34, and 35 between the encoders 10 and the second stage multiplexer 14. The control channel 32 may use, for example, standard 10/100-Base-T Ethernet.

The present invention uses a statmux control processor 20 at the second stage multiplexer 14 to control the statistical multiplexing process. In prior art designs, each first stage multiplexer 12 provided statistical multiplexing controls for up to 30 encoders connected to it. Allocating and sharing of bandwidth was kept within this grouping. The revised architecture of the present invention provides statistical multiplexing for all the encoders 10.

It should now be appreciated that the present invention provides advantageous methods and apparatus for controlling statistical multiplexing of a large number of services.

Although the invention has been described in connection with various illustrated embodiments, numerous modifications and adaptations may be made thereto without departing from the spirit and scope of the invention as set forth in the claims.

What is claimed is:

1. A method for statistical multiplexing of a plurality of data streams, comprising:
   communicating a bandwidth request message from each of a plurality of encoders to a second stage multiplexer;
   allocating available bandwidth at said second stage multiplexer based on said bandwidth request messages;
   communicating an allocated bandwidth message to each of said encoders which contains an allocated bandwidth for each encoder based on said allocating;
   encoding a data stream at each encoder in accordance with the allocated bandwidth for that encoder to provide an encoded data stream from each encoder;
   multiplexing a plurality of said encoded data streams at a first stage multiplexer to provide a multiplexed data stream at a constant data rate; and
   multiplexing at said second stage multiplexer a plurality of said multiplexed data streams from a plurality of said first stage multiplexers to provide a multiplexed transport stream.

2. A method in accordance with claim 1, wherein:
   each of said bandwidth request messages is based on a video complexity level of the content to be encoded.

3. A method in accordance with claim 1, further comprising:
   periodically reallocating said bandwidth based on newly received bandwidth request messages.

4. A method in accordance with claim 1, further comprising:
   providing a number of null packets to said plurality of encoded data streams at said first stage multiplexer in the event that a total bandwidth allocated to the encoders associated with said first stage multiplexer is less than said constant data rate; and
   stripping off said null packets from said multiplexed data stream at said second stage multiplexer.

5. A method in accordance with claim 4, further comprising:
   providing an amount of additional data to said first stage multiplexer; and
   reducing said number of null packets corresponding to said amount of additional data.

6. A method in accordance with claim 4, wherein said data streams comprise television services.

7. A method in accordance with claim 6, further comprising:
   adding or deleting services at said first stage multiplexer; and
   adding or deleting a number of null packets corresponding to said adding or deleting of said services.

8. A method in accordance with claim 6, further comprising:
   activating or deactivating services at said first stage multiplexer;
   adding or deleting a number of null packets corresponding to said activating or deactivating of said services.

9. A method in accordance with claim 6, further comprising:
   changing bandwidth allocated to the services at said first stage multiplexer while maintaining said constant data rate.

10. A method in accordance with claim 4, wherein:
    a total data rate output from said plurality of first stage multiplexers, including said null packets, is greater than said available bandwidth of said second stage multiplexer.

11. A method in accordance with claim 1, further comprising:
    providing a dedicated control channel between said encoders and said second stage multiplexer for sending said bandwidth request messages and said allocated bandwidth messages.

12. A method in accordance with claim 11, further comprising:
    partitioning said dedicated control channel into a plurality of subnets.

13. An apparatus for statistical multiplexing of a plurality of data streams, comprising:
    a plurality of first stage multiplexers;
    a plurality of encoders operatively associated with each first stage multiplexer;
    a second stage multiplexer operatively associated with said plurality of first stage multiplexers; and
    a statmux control processor operatively associated with said second stage multiplexer;
    wherein:
    a bandwidth request message is communicated from each of said encoders to said statmux control processor;
    said stamux control processor allocates available bandwidth based on said bandwidth request messages;
    said statmux control processor communicates an allocated bandwidth message to each of said encoders which contains an allocated bandwidth for each of said encoders based on said allocating;
    each of said encoders encodes a data stream in accordance with the allocated bandwidth for that encoder, providing an encoded data stream from each encoder;

each of said first stage multiplexers multiplexes a plurality of said encoded data streams from the encoders associated therewith, providing a multiplexed data stream at a constant data rate from each of said first stage multiplexers; and said second stage multiplexer multiplexes a plurality of said multiplexed data streams from said first stage multiplexers to, provide a multiplexed transport stream.

14. Apparatus in accordance with claim 13, wherein:
each of said bandwidth request messages is based on a video complexity level of the content to be encoded.

15. Apparatus in accordance with claim 13, further comprising:
said statmux control processor periodically reallocates said bandwidth based on newly received bandwidth request messages.

16. Apparatus in accordance with claim 13, wherein:
a number of null packets are provided to said plurality of encoded data streams at one of said first stage multiplexers in the event that a total bandwidth allocated to the encoders associated with that first stage multiplexer is less than said constant data rate; and
said null packets are stripped off from said multiplexed data stream at said second stage multiplexer.

17. Apparatus in accordance with claim 16, wherein:
an amount of additional data is provided to said first stage multiplexer; and
said number of null packets is reduced corresponding to said amount of additional data.

18. Apparatus in accordance with claim 16, wherein said data streams comprise television services.

19. Apparatus in accordance with claim 18, wherein:
services are added or deleted at said first stage multiplexers; and
a number of null packets are added or deleted corresponding to said added or deleted services.

20. Apparatus in accordance with claim 18, further comprising:
services are activated or deactivated at said first stage multiplexers;
a number of null packets are added or deleted corresponding to said activated or deactivated services.

21. Apparatus in accordance with claim 18, wherein:
bandwidth allocated to the services is changed at said first stage multiplexers while maintaining said constant data rate.

22. Apparatus in accordance with claim 16, wherein:
a total data rate output from said plurality of first stage multiplexers, including said null packets, is greater than said available bandwidth of said second stage multiplexer.

23. Apparatus in accordance with claim 13, further comprising:
a dedicated control channel between said encoders and said statmux control processor for sending said bandwidth request messages and said allocated bandwidth messages.

24. Apparatus in accordance with claim 23, wherein:
said dedicated control channel comprises a plurality of subnets.

* * * * *